United States Patent
Stearns et al.

(12)

(10) Patent No.: US 11,664,761 B2
(45) Date of Patent: *May 30, 2023

(54) SOLAR PANEL COUPLING STABILIZATION SYSTEM

(71) Applicant: EcoFasten Solar, LLC, Phoenix, AZ (US)

(72) Inventors: Brian Cecil Stearns, Tucson, AZ (US); Alexander Grant Bornemann, Phoenix, AZ (US)

(73) Assignee: Ecofasten Solar, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/315,003

(22) Filed: May 7, 2021

(65) Prior Publication Data
US 2021/0265940 A1    Aug. 26, 2021

Related U.S. Application Data

(63) Continuation of application No. 15/629,738, filed on Jun. 21, 2017, now Pat. No. 11,012,023, which is a
(Continued)

(51) Int. Cl.
*H02S 20/23* (2014.01)
*F24S 25/634* (2018.01)
(Continued)

(52) U.S. Cl.
CPC .............. *H02S 20/23* (2014.12); *F24S 25/61* (2018.05); *F24S 25/634* (2018.05);
(Continued)

(58) Field of Classification Search
CPC .......... H02S 20/23; H02S 20/24; H02S 20/20; H02S 20/22; H02S 30/10; H02S 20/00;
(Continued)

(56) References Cited

U.S. PATENT DOCUMENTS

| 980,505 A | 1/1911 | Emmet | |
| 3,511,001 A * | 5/1970 | Morgan, Jr. ...... | E04F 15/02476 52/126.5 |

(Continued)

FOREIGN PATENT DOCUMENTS

WO   PCT/JP2012/068562    7/2012

OTHER PUBLICATIONS

Notice of Allowance from the USPTO for U.S. Appl. No. 15/629,738 dated Jul. 16, 2020 (5 pages).
(Continued)

*Primary Examiner* — Kyle J. Walraed-Sullivan
(74) *Attorney, Agent, or Firm* — KW Law, LLP

(57) ABSTRACT

In various embodiments, a stabilization assembly may comprise a shaft, a foot, a snap plate and a nut. The foot may be operatively coupled to the shaft. The snap plate may be configured to surround and retain the shaft. The nut may be installable on the shaft and engagable to raise and lower a foot. The stabilization assembly may be installed in a solar panel coupling. The foot may be driven to engagement with a roof surface in response to the coupling being installed on the roof.

7 Claims, 16 Drawing Sheets

Related U.S. Application Data continuation-in-part of application No. 14/680,226, filed on Apr. 7, 2015, now Pat. No. 9,985,575.

(60) Provisional application No. 62/353,300, filed on Jun. 22, 2016, provisional application No. 62/134,205, filed on Mar. 17, 2015, provisional application No. 62/131,480, filed on Mar. 11, 2015, provisional application No. 62/106,406, filed on Jan. 22, 2015, provisional application No. 62/106,410, filed on Jan. 22, 2015, provisional application No. 62/106,282, filed on Jan. 22, 2015, provisional application No. 62/073,867, filed on Oct. 31, 2014, provisional application No. 61/976,448, filed on Apr. 7, 2014.

(51) Int. Cl.
*F24S 25/70* (2018.01)
*F24S 25/61* (2018.01)
*F24S 25/636* (2018.01)
F24S 25/60 (2018.01)
F24S 25/00 (2018.01)

(52) U.S. Cl.
CPC .............. *F24S 25/636* (2018.05); *F24S 25/70* (2018.05); *F24S 2025/018* (2018.05); *F24S 2025/6004* (2018.05); *F24S 2025/6006* (2018.05); *F24S 2025/6008* (2018.05); *F24S 2025/801* (2018.05); *Y02B 10/10* (2013.01); *Y02B 10/20* (2013.01); *Y02E 10/47* (2013.01)

(58) Field of Classification Search
CPC .......... F24S 25/70; F24S 25/636; F24S 25/61; F24S 2025/6005; F24S 2025/6006; F24S 25/632; F24S 25/634; F24S 25/67; F24S 2025/6004; F24S 2025/8081; F24S 2025/807; F24J 2/5258; F24J 2/5264; F24J 2/5256; F24J 2/526; F24J 2/5262; F24J 2/5254; F24J 2002/4669; F24J 2002/4667; Y02E 20/47; Y02E 10/47; Y02B 10/12; Y02B 10/20
See application file for complete search history.

(56) References Cited

U.S. PATENT DOCUMENTS

| | | | |
|---|---|---|---|
| 4,426,813 A * | 1/1984 | Buzzi, Jr. | F24S 20/67 52/27 |
| 4,558,544 A | 12/1985 | Albrecht | |
| 5,333,423 A | 8/1994 | Propst | |
| 5,501,754 A | 3/1996 | Hilraguri | |
| 5,603,187 A | 2/1997 | Merrin | |
| 5,862,635 A | 1/1999 | Linse | |
| 6,205,719 B1 | 3/2001 | Bruce | |
| 6,442,906 B1 | 9/2002 | Hwang | |
| 6,726,117 B2 * | 4/2004 | Herb | F16B 37/045 238/315 |
| 7,001,098 B2 * | 2/2006 | Lin | F16B 9/052 403/408.1 |
| 7,592,537 B1 * | 9/2009 | West | H02S 20/23 136/251 |
| 7,780,472 B2 * | 8/2010 | Lenox | H02S 20/23 439/567 |
| 8,136,311 B2 | 3/2012 | Liu | |
| 8,448,405 B2 * | 5/2013 | Schaefer | F24S 25/61 52/710 |
| 8,505,864 B1 | 8/2013 | Taylor | |
| 8,627,617 B2 | 1/2014 | Haddock | |
| 8,683,761 B2 | 4/2014 | Danning | |
| 8,740,163 B1 | 6/2014 | Taylor | |
| 8,925,263 B2 * | 1/2015 | Haddock | F16B 2/065 52/173.3 |
| 8,935,893 B2 * | 1/2015 | Liu | F16L 3/06 52/173.3 |
| 9,010,041 B2 * | 4/2015 | Danning | F16B 5/004 52/173.3 |
| 9,276,519 B2 * | 3/2016 | Kobayashi | F24S 25/61 |
| 9,299,868 B2 | 3/2016 | Thomas | |
| 9,431,953 B2 * | 8/2016 | Stearns | F24S 25/632 |
| 9,506,600 B1 * | 11/2016 | Li | F24S 25/65 |
| 9,531,319 B2 * | 12/2016 | Braunstein | H02S 30/10 |
| 9,611,652 B2 * | 4/2017 | Haddock | E04B 1/61 |
| 9,660,570 B2 * | 5/2017 | Stephan | H02S 20/20 |
| 9,745,754 B1 | 8/2017 | Narita | |
| 9,748,892 B2 | 8/2017 | Almy | |
| 9,752,331 B2 | 9/2017 | Kugler | |
| 9,800,199 B2 | 10/2017 | Meine | |
| 9,837,955 B1 | 12/2017 | Schuit | |
| 9,853,594 B2 | 12/2017 | Almy | |
| 9,876,462 B2 | 1/2018 | Hudson | |
| 9,876,463 B2 * | 1/2018 | Jasmin | F24S 25/65 |
| 9,906,188 B2 | 2/2018 | Almy | |
| 9,985,361 B2 | 5/2018 | Martin | |
| 9,985,575 B2 | 5/2018 | Stearns | |
| 2005/0115176 A1 * | 6/2005 | Russell | E04D 3/3608 52/220.1 |
| 2007/0212935 A1 | 9/2007 | Lenox | |
| 2008/0302928 A1 * | 12/2008 | Haddock | E04F 13/0821 248/205.1 |
| 2009/0200443 A1 * | 8/2009 | Burtscher | F24S 25/636 248/316.1 |
| 2009/0232616 A1 * | 9/2009 | Sekreta | F16B 37/046 411/107 |
| 2010/0192505 A1 | 8/2010 | Schaefer | |
| 2010/0276558 A1 | 11/2010 | Faust | |
| 2011/0049322 A1 | 3/2011 | Pham | |
| 2011/0100434 A1 * | 5/2011 | Van Walraven | H02S 20/00 136/251 |
| 2011/0138585 A1 | 6/2011 | Kmita | |
| 2011/0214365 A1 | 9/2011 | Aftanas | |
| 2011/0299957 A1 | 12/2011 | Young | |
| 2012/0144760 A1 | 6/2012 | Schaefer | |
| 2012/0222380 A1 | 9/2012 | Wentworth | |
| 2012/0240484 A1 | 9/2012 | Blom | |
| 2012/0244729 A1 | 9/2012 | Rivera | |
| 2012/0248271 A1 | 10/2012 | Zeilenga | |
| 2012/0267490 A1 * | 10/2012 | Haddock | H02S 20/22 248/221.11 |
| 2013/0009025 A1 | 1/2013 | Stearns | |
| 2013/0011187 A1 | 1/2013 | Schuit | |
| 2013/0042559 A1 | 2/2013 | Weber | |
| 2013/0074441 A1 | 3/2013 | Stearns | |
| 2013/0111713 A1 | 5/2013 | McPheeters | |
| 2013/0152489 A1 | 6/2013 | Weber | |
| 2013/0200245 A1 | 8/2013 | Markiewicz | |
| 2013/0248668 A1 | 9/2013 | Lu | |
| 2013/0291479 A1 | 11/2013 | Schaefer | |
| 2013/0294814 A1 * | 11/2013 | Sader | H02S 20/00 403/21 |
| 2013/0320166 A1 * | 12/2013 | Kemple | F24S 25/636 248/220.22 |
| 2013/0340358 A1 | 12/2013 | Danning | |
| 2013/0340381 A1 | 12/2013 | Danning | |
| 2013/0340811 A1 | 12/2013 | Danning | |
| 2014/0010616 A1 | 1/2014 | Meine | |
| 2014/0041706 A1 | 2/2014 | Haddock | |
| 2014/0042286 A1 | 2/2014 | Jaffari | |
| 2014/0091050 A1 | 4/2014 | Zhang | |
| 2014/0093307 A1 * | 4/2014 | Zhang | F16B 2/12 403/188 |
| 2014/0102517 A1 | 4/2014 | Meine | |
| 2014/0175244 A1 | 6/2014 | West | |
| 2014/0290717 A1 * | 10/2014 | Chiu | F24S 25/61 136/251 |
| 2014/0318045 A1 | 10/2014 | Gezelman | |
| 2014/0353435 A1 | 12/2014 | Liu | |
| 2015/0075590 A1 | 3/2015 | West | |
| 2015/0102194 A1 * | 4/2015 | Liu | F24S 25/35 248/316.1 |
| 2015/0107168 A1 | 4/2015 | Kobayashi | |

(56) References Cited

U.S. PATENT DOCUMENTS

| | | | |
|---|---|---|---|
| 2015/0129517 A1 | 5/2015 | Wildes | |
| 2015/0155821 A1* | 6/2015 | West | F24S 25/20 136/251 |
| 2015/0155823 A1* | 6/2015 | West | H02S 20/23 248/346.04 |
| 2015/0180404 A1 | 6/2015 | Braunstein | |
| 2015/0184896 A1* | 7/2015 | Lippert | F24S 25/636 211/41.1 |
| 2015/0247326 A1 | 9/2015 | Haddock | |
| 2015/0249423 A1 | 9/2015 | Braunstein | |
| 2015/0263666 A1 | 9/2015 | Powers | |
| 2015/0280639 A1 | 10/2015 | Atchley | |
| 2015/0288320 A1 | 10/2015 | Stearns | |
| 2015/0311606 A1* | 10/2015 | Meine | F16B 7/187 439/100 |
| 2016/0069592 A1* | 3/2016 | Giraudo | H02S 20/20 126/704 |
| 2016/0111996 A1 | 4/2016 | Stephan | |
| 2016/0111997 A1* | 4/2016 | Ganshaw | F16M 13/02 248/224.7 |
| 2016/0111999 A1* | 4/2016 | Stapleton | E04B 1/40 52/173.3 |
| 2016/0142006 A1 | 5/2016 | Meine | |
| 2016/0248367 A1 | 8/2016 | Almy | |
| 2016/0248369 A1 | 8/2016 | Almy | |
| 2016/0268958 A1* | 9/2016 | Wildes | F24S 25/70 |
| 2016/0268959 A1* | 9/2016 | Meine | F24S 25/70 |
| 2016/0282016 A1 | 9/2016 | Ash | |
| 2016/0308487 A1 | 10/2016 | Molina | |
| 2016/0352283 A1 | 12/2016 | Stearns | |
| 2017/0040934 A1* | 2/2017 | Xie | H02S 30/10 |
| 2017/0047884 A1 | 2/2017 | Almy | |
| 2017/0102167 A1* | 4/2017 | Stephan | F24S 25/636 |
| 2017/0194896 A1* | 7/2017 | Martin | F16B 2/065 |
| 2017/0194902 A1 | 7/2017 | Meine | |
| 2017/0201207 A1 | 7/2017 | Hudson | |
| 2017/0279404 A1 | 9/2017 | Truthseeker | |
| 2017/0302221 A1 | 10/2017 | Jasmin | |
| 2018/0076755 A1 | 3/2018 | Wildes | |

OTHER PUBLICATIONS

Notice of Allowance from the USPTO for U.S. Appl. No. 15/629,738 dated May 21, 2020 (10 pages).
Office Action from the USPTO for U.S. Appl. No. 15/629,738 dated Oct. 11, 2019 (14 pages).
Office Action from the USPTO for U.S. Appl. No. 15/629,738 dated Mar. 28, 2019 (12 pages).
Office Action from the USPTO for U.S. Appl. No. 15/629,738 dated Dec. 4, 2018 (15 pages).
Office Action from the USPTO for U.S. Appl. No. 15/629,738 dated Jun. 18, 2018 (9 pages).

* cited by examiner

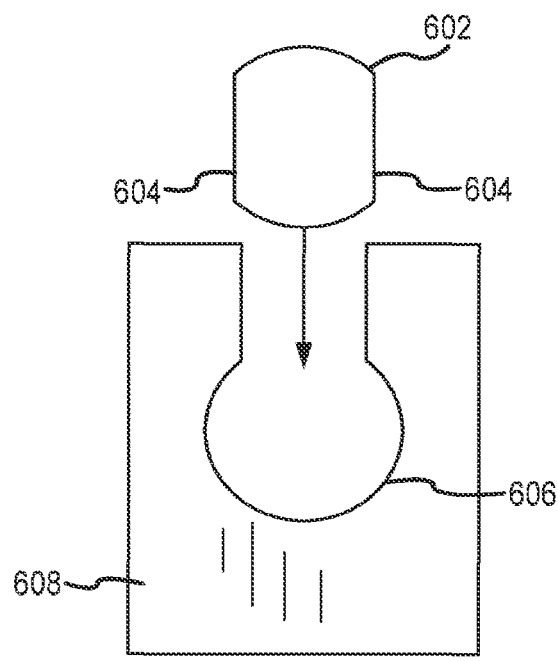
FIG.6A
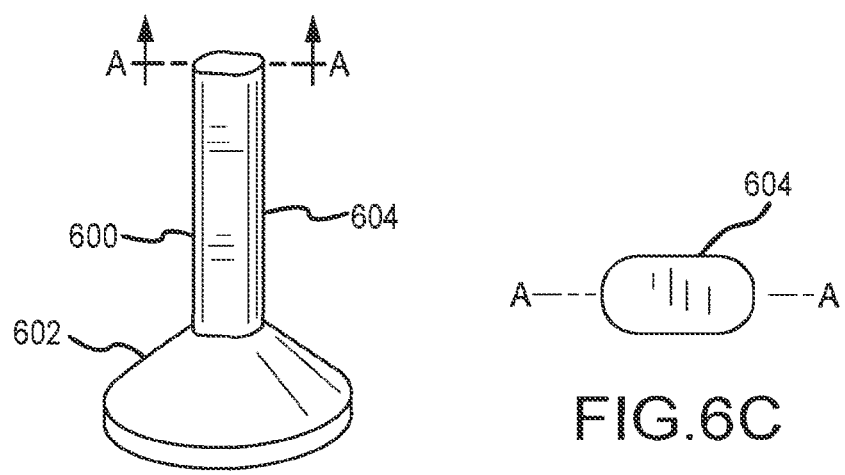
FIG.6B
FIG.6C

SOLAR PANEL COUPLING STABILIZATION SYSTEM

CROSS REFERENCE TO RELATED APPLICATIONS

The present application claims is a continuation of U.S. Ser. No. 15/629,738 issued as U.S. Pat. No. 11,012,023, which claims priority to and the benefit of U.S. Provisional Patent Application No. 62/353,300, filed Jun. 22, 2016. The entire contents of all of the above applications are hereby incorporated by reference herein for any purpose.

The present application claims is a continuation of U.S. Ser. No. 15/629,738 issued as U.S. Pat. No. 11,012,023, which is a continuation in part of U.S. patent application Ser. No. 14/680,226 filed on Apr. 7, 2015 (the '226 application) issued as U.S. Pat. No. 9,985,575. The '226 application claims the benefit of and priority to U.S. Provisional Patent Application No. 62/134,205, filed Mar. 17, 2015, and to U.S. Provisional Patent Application No. 62/131,480, filed Mar. 11, 2015, and to U.S. Provisional Patent Application No. 62/106,410, filed Jan. 22, 2015, and to U.S. Provisional Patent Application No. 62/106,406, filed Jan. 22, 2015, and to U.S. Provisional Patent Application No. 62/106,282, filed Jan. 22, 2015, and to U.S. Provisional Patent Application No. 62/073,867, filed Oct. 31, 2014, and to U.S. Provisional Patent Application No. 61/976,448, filed Apr. 7, 2014. The entire contents of all of the above applications are hereby incorporated by reference herein for any purpose.

FIELD

The present disclosure relates to a load bearing and stabilization system for solar panel arrays.

SUMMARY

In various embodiments, a stabilization assembly may comprise a shaft, a foot, a snap plate and a nut. The foot may be operatively coupled to the shaft. The snap plate may be configured to surround and retain the shaft. The nut may be installable on the shaft and engagable to raise and lower a foot. The stabilization assembly may be installed in a solar panel coupling. The foot may be driven to engagement with a roof surface in response to the coupling being installed on the roof.

In various embodiments, the stabilization assembly is configured to stabilize a solar panel coupling to aid in the installation of solar panels. The shaft or the foot may be configured to create a loaded engagement between the coupling and the roof surface in response to being installed on the roof surface.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIGS. 6A-6C illustrate various views of a fifth stabilization system, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1A:
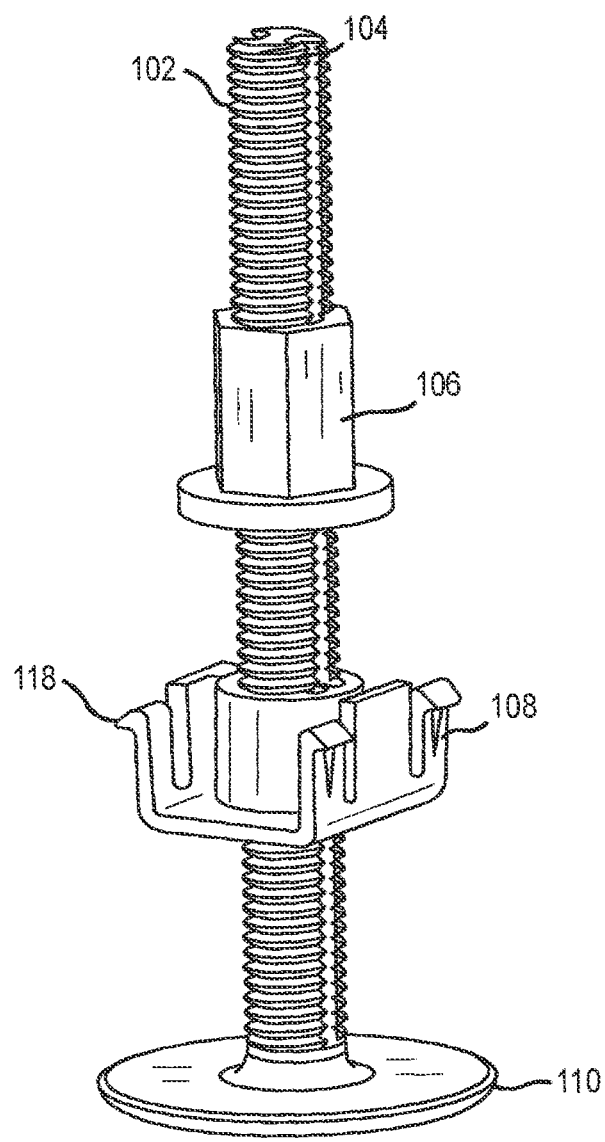
FIGS. 1A-1B illustrate perspective views of first stabilization foot, in accordance with various embodiments.
Figure 1B:
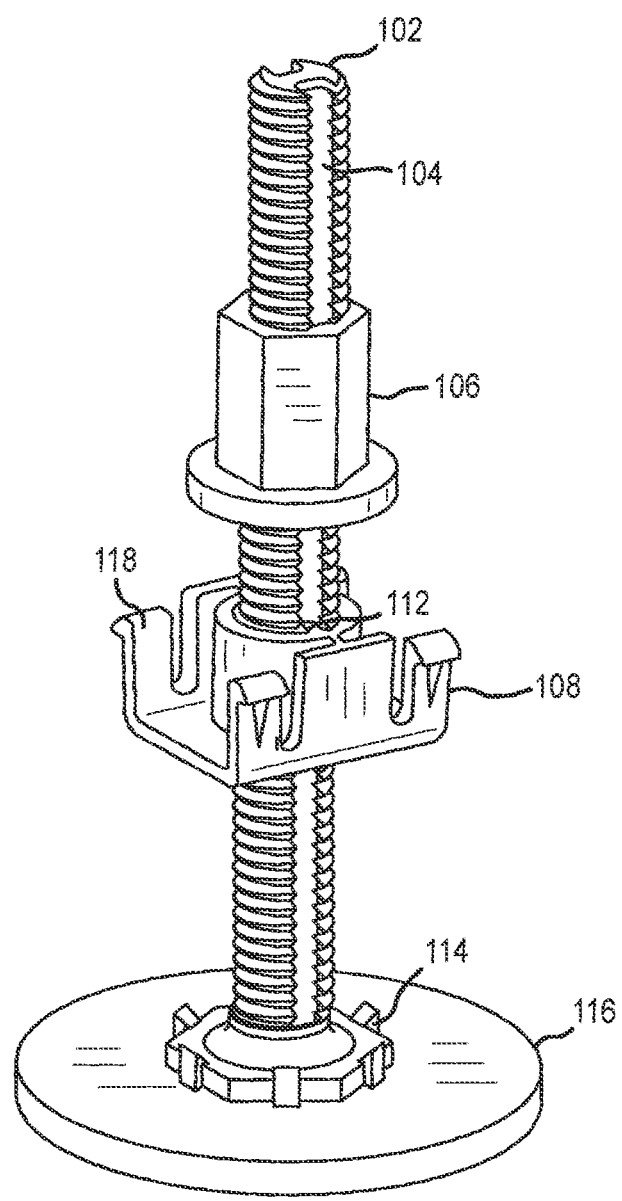

In various embodiments and with reference to FIG. 1A and FIG. 1B, a load bearing and stabilization assembly 100 is provided. Assembly 100 may comprise a shaft 102, a nut 106, a snap plate 108, and a foot 110. Shaft 102 may include a slot 104. Snap plate 108 may comprise an alignment tooth 112. Snap plate 108 may be installable over shaft 102. In this regard, snap plate 108 may be configured to freely move up and down shaft 102. Alignment tooth 112 may be configured to be installable within slot 104 of shaft 102. Snap plate 108 may also comprise two or more alignment teeth 112 that are configured to engage two or more slots 104 in shaft 102.]

In various embodiments, shaft 102 may be operatively coupled to a foot. For example, shaft 102 may include an integrally formed foot 110. Shaft 102 may also comprise a foot mounting platform 114 that is configured to engage a separately formed foot 116. In this regard, mounting platform 114 may be snapped together with foot 116.

Figure 2A:
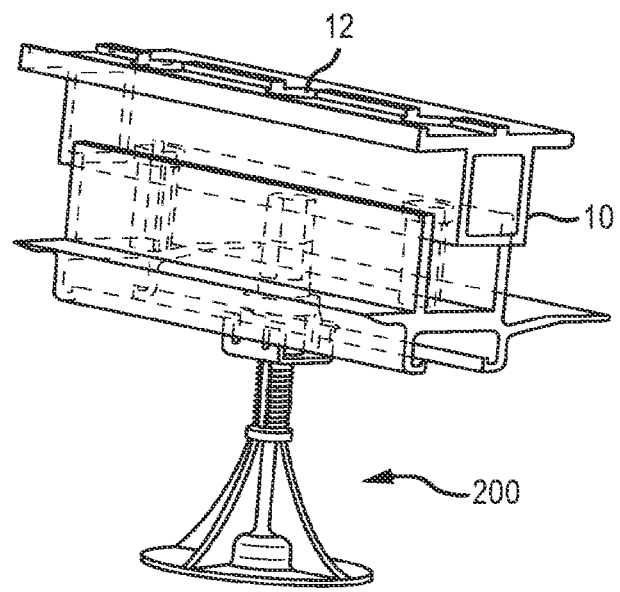
FIGS. 2A-2D illustrate various views of a stabilization foot with a solar panel coupling, in accordance with various embodiments.
Figure 2B:
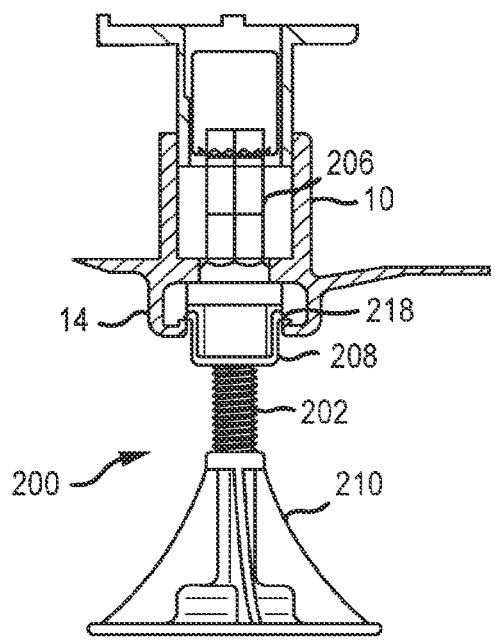
Figure 2C:
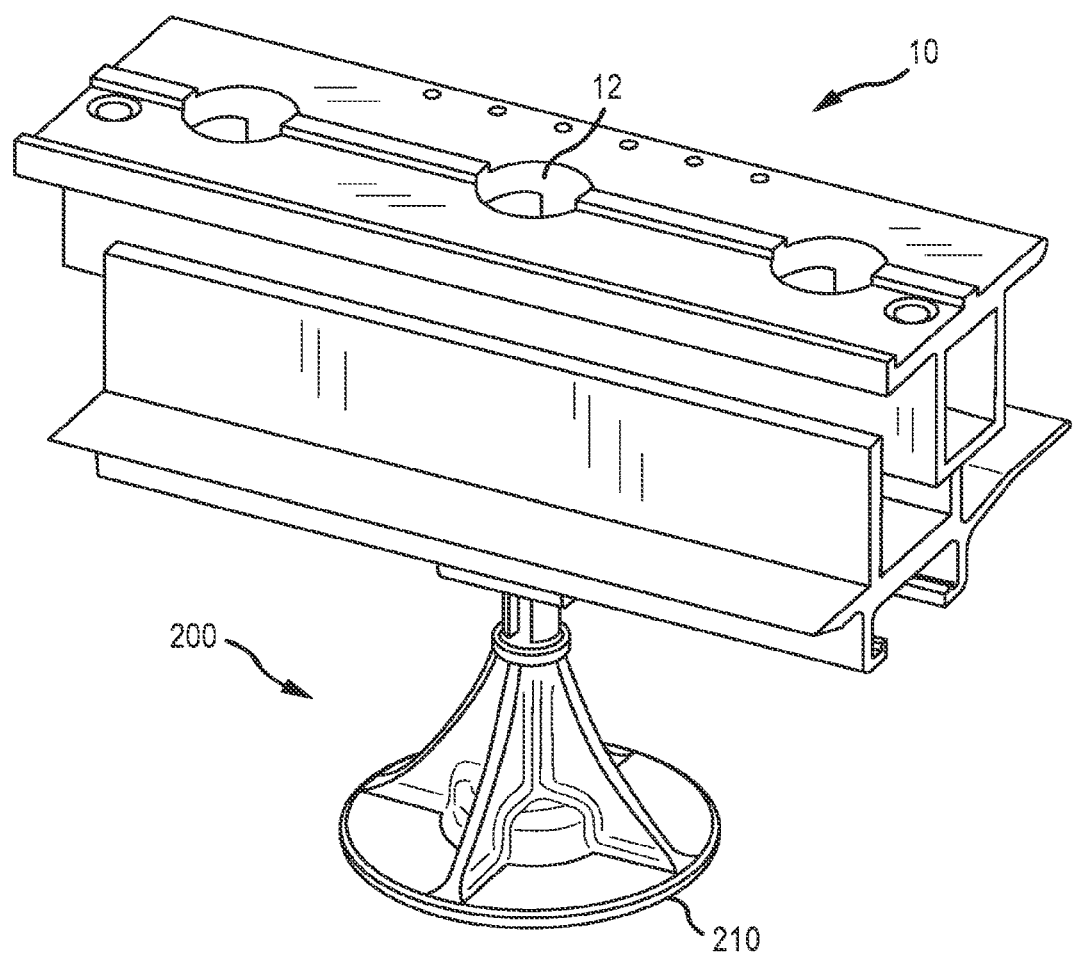
Figure 2D:
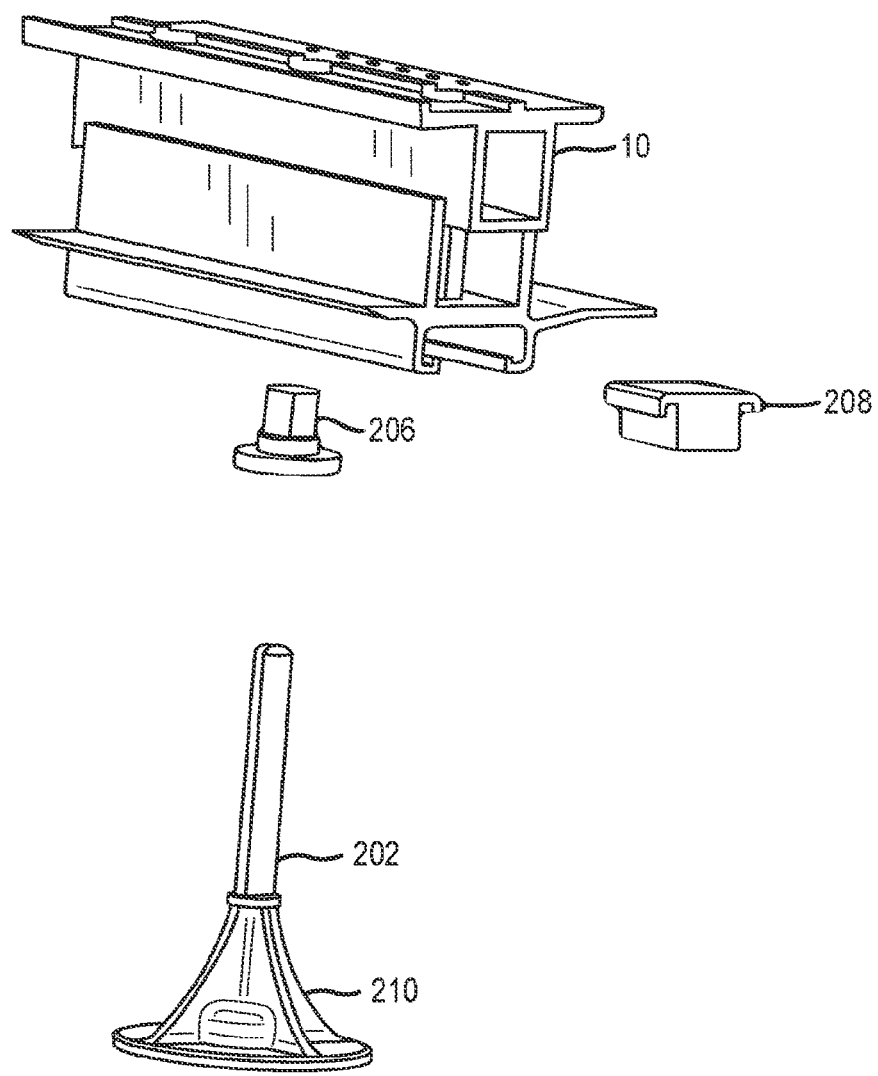

In various embodiments, nut 106 may be threaded on shaft 102. Nut 106 may be engagable by a user when stabilization assembly 100 is installed in a solar panel coupling (e.g., a coupling like coupling 10 shown in FIG. 2A). Nut 106 may be actuated by a user from above a solar panel array after the array has been mounted to the roof. Stabilization assembly 100 may be installed through a hole in the bottom of the coupling. Snap plate 108 may be pushed into and lock into a channel in the coupling. In this regard, snap plate 108 may have one or more deformable arms 118. Deformable arm 118 may be configured to elastically deform when pressed into a channel of the coupling. Moreover, deformable arms 118 may be configured to engage portions of the channel in the coupling. This may cause assembly 100 to be positively retained in the coupling.

In various embodiments and in operation, snap plate 108 may retain assembly 100 within a channel of the coupling. Snap plate 108 may also hold shaft 102 stationary and prevent it from spinning. An installer may access and actuate (e.g., spin) nut 106 to create a stabilizing, load bearing connections on the roof surface. The installer may install assembly 100 on a panel, position the panel on the roof, and actuate the nut so that assembly 100 engages the roof surface, causing foot 110 and/or foot 116 to contact the roof and stabilize the panel. In this regard, stabilizing assembly 100 may be an installation aid for the installer on the roof In various embodiments and with reference to FIGS. 2A-2D, stabilization assembly 200 may be installed in a coupling 10. Assembly 200 may be installed at any suitable point in coupling 10. For example, assembly 200 may be installed in a center hole 12 of coupling 10. Center hole 12 may be defined through the upper and lower portions of coupling 10 such that it allows assembly 200 to be installed in through a bottom portion of coupling 10 and to be accessed from a top portion of coupling 10.

In various embodiments, one or more deformable arms 218 of snap plate 208 may engage a bottom channel 14 of coupling 10. Nut 206 may be threaded on shaft 202. Nut 206 may be captured in channel 14 by a bottom surface of coupling 10 and snap plate 208. Shaft 202 may also include an integrally formed foot 210. In this regard, shaft 202 and foot 210 may be a single piece of molded plastic, machined metal, and/or the like.

In various embodiments, nut 206 may have a tapered body. In this regard, nut 206 may be engagable by more than one tool (e.g., a ½-inch socket, a 9/16-inch socket, a 5/8-inch socket, and/or the like). This may allow for single tool operation where all fasteners used to support and attach and array include a common sized fastener. The tapered wall may also allow for additional material at the base of nut 206, providing improved structural properties and load bearing capability.

Figure 3A:
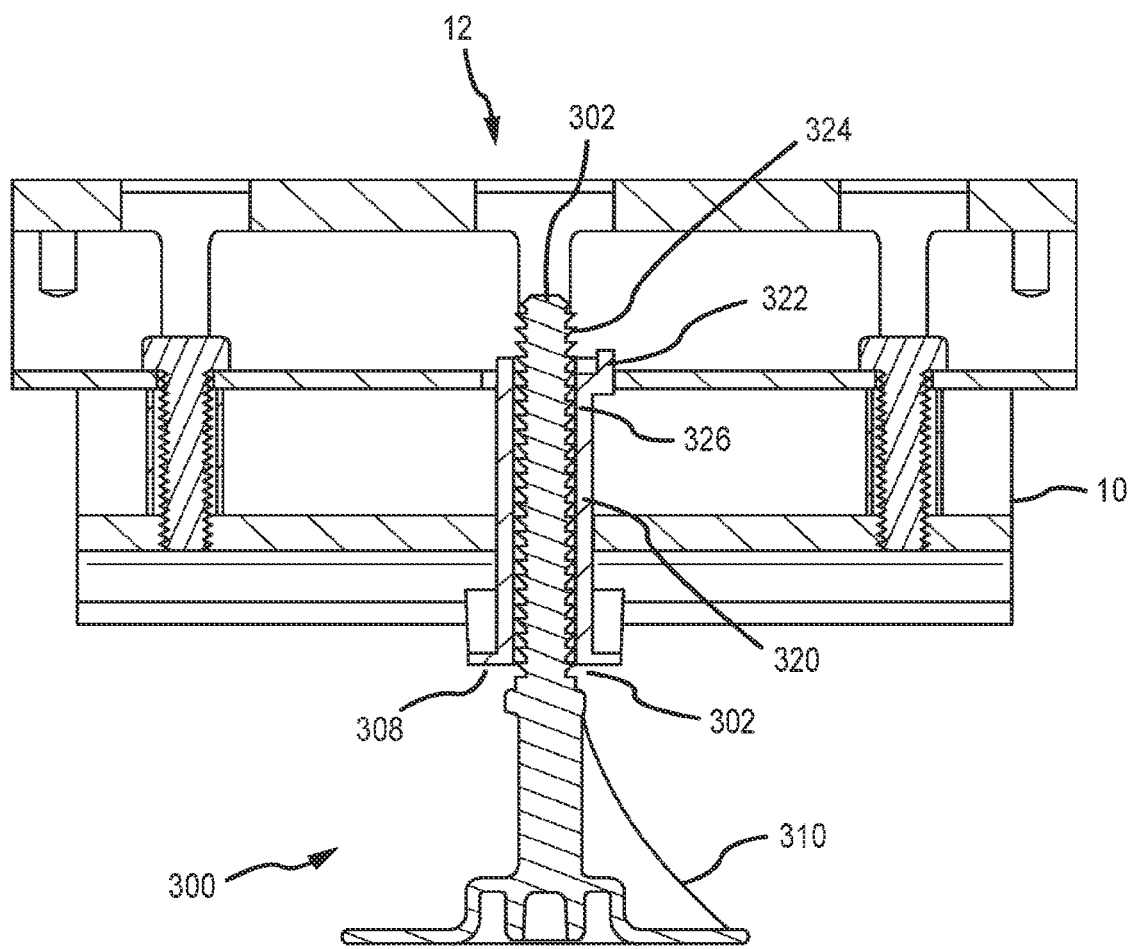
FIGS. 3A-3B illustrate cross sectional view of a second stabilization foot with a coupling and perspective view of the second stabilization foot, in accordance with various embodiments.
Figure 3B:
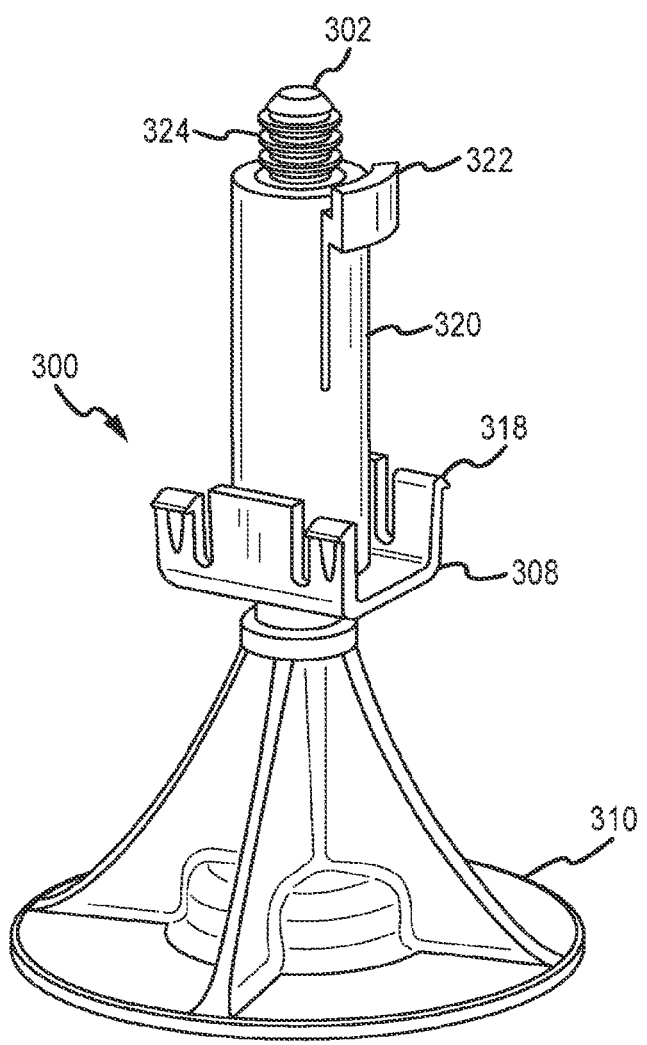

In various embodiments and with reference to FIGS. 3A-3B, stabilization assembly 300 may comprise a shaft 302 that includes a plurality of ribs or teeth 324. Stabilization system 300 may also comprise a snap housing 320. Snap housing 320 may include a snap plate 308. Snap plate 308 may also include one or more deformable arms 318 that are configured to snap into coupling 10. Snap housing 320 may define a channel that is configured to surround and receive shaft 102. Snap housing 320 may also include one or more teeth 326 defined along the channel Teeth 326 of snap housing 320 may be configured to engage one or more teeth 324 of shaft 302. Shaft 302 may be adjustable relative to snap housing 320.

In various embodiments, a user may exert a force (e.g., pull or push) on a portion of shaft 302 and/or foot 310 causing teeth 324 and teeth 326 to move relative to one another. In this regard, shaft 302 and snap housing 320 may have a movable, interlocking relationship via teeth 324 and 326. This force may cause shaft 302 and foot 310 to adjust relative to the bottom surface of coupling 10 creating an engagement and/or load on a roof surface when coupling 10 is installed on a roof with one or more solar panels. Moreover, the engagement of roof surface with foot 310 may stabilize a portion of the solar panel array assembled around coupling 10 aiding in installation of panels in coupling 10.

Figure 4A:
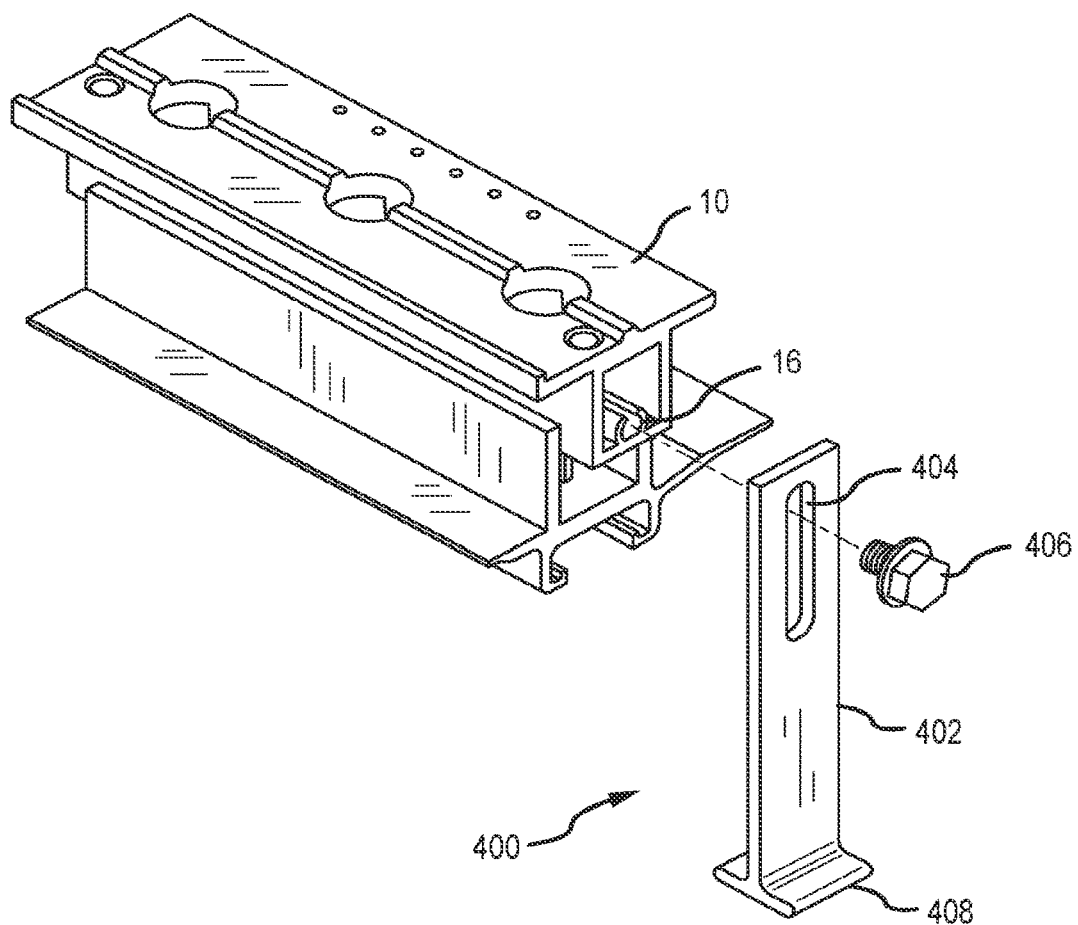
FIGS. 4A-4B illustrate various view of a third stabilization foot with a coupling, in accordance with various embodiments.
Figure 4B:
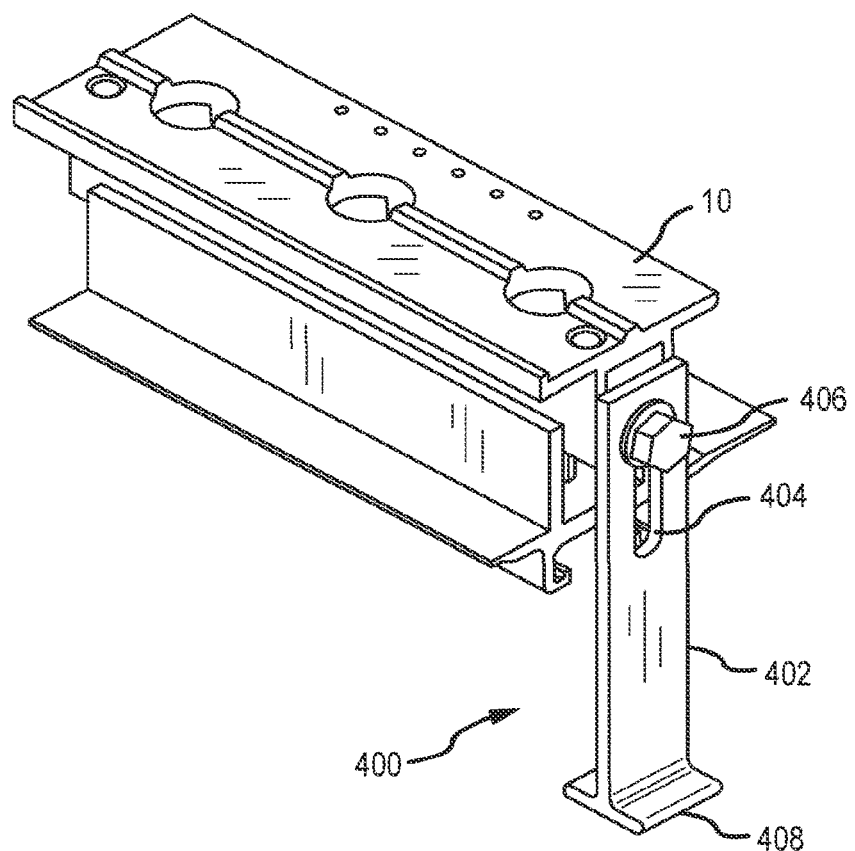

In various embodiments and with reference to FIGS. 4A and 4B, stabilization assembly 400 may comprise support shaft 402 with a foot 408. Support shaft may include and/or define an adjustment slot 406. Adjustment slot 404 may be configured to receive and/or surround a portion of fastener 406. Fastener 406 may be installable through slot 404. Fastener 406 may also be configured to engage a threaded portion 16 of coupling 10. The height of shaft 402 and/or the engagement of foot 408 on a roof surface when coupling 10 is installed may be adjusted along the length of slot 404. In this regard, fastener 406 may be accessible to adjust shaft 402 and/or foot 408 into engagement with the roof surface to create a stabilizing load on the roof surface after coupling 10 has been installed on one or more solar panels.

Figure 5A:
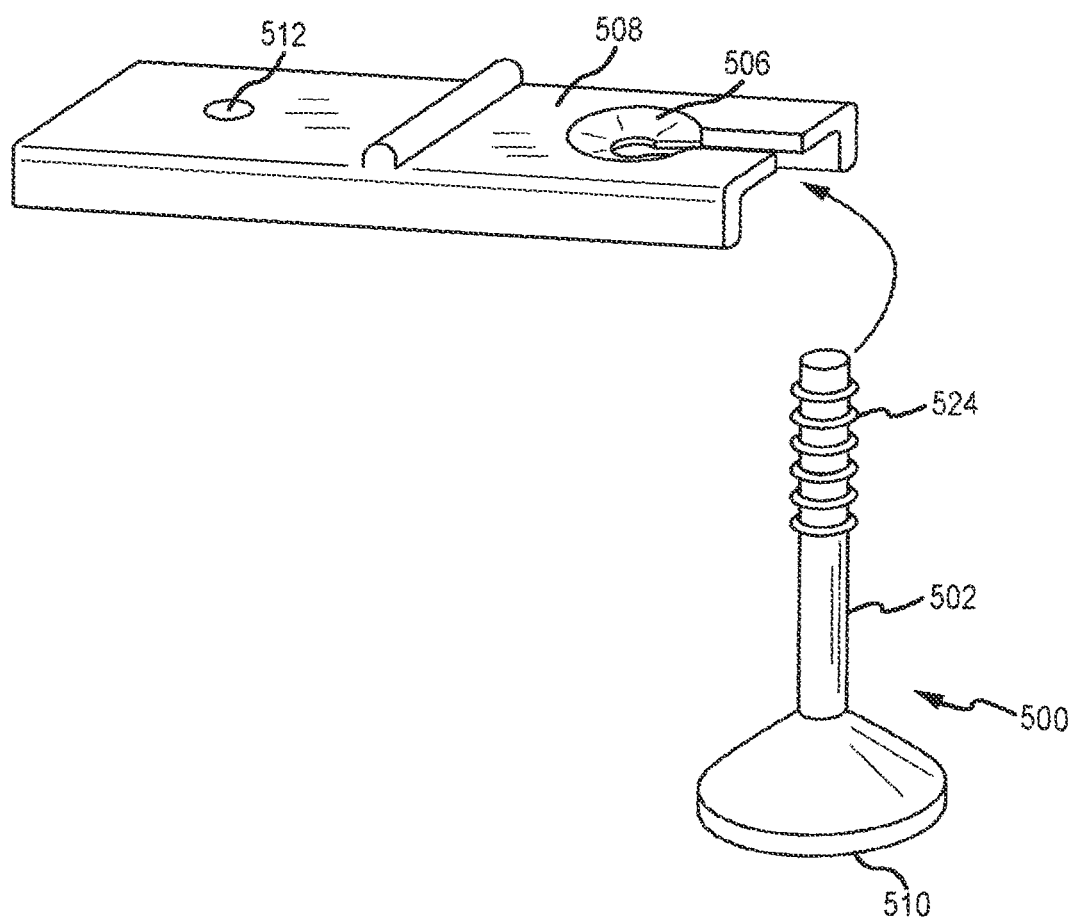
FIGS. 5A-5B, illustrate various view of a fourth stabilization system, in accordance with various embodiments.
Figure 5B:
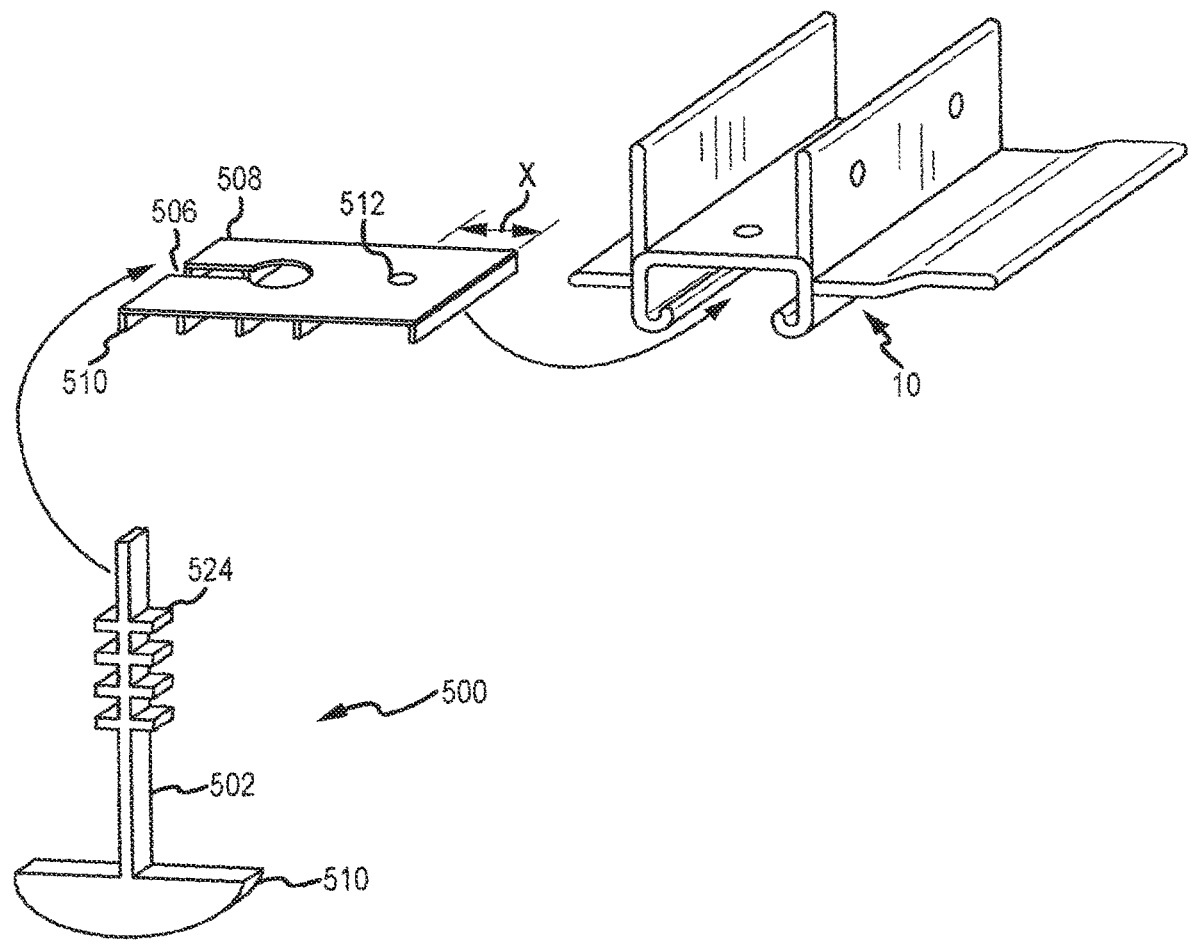

In various embodiments and with reference to FIGS. 5A-5B, stabilization system 500 may include shaft 502 with foot 510. Shaft 502 may also include one or more tabs 524 protruding from and substantially perpendicular to the centerline of shaft 502. Stabilization system 500 may also comprise a mounting tab 508. Mounting tab 508 may be installable in coupling 10. Mounting tab 508 may include and/or define a hole 512. Hole 512 may in aligned with and secured by an existing fastener in coupling 10. In this regard, hole 512 may be sized to allow a fastener in the coupling to freely pass through mounting tab 508. Hole 512 may also be threaded and configured to receive the fastener of the coupling such that the fastener could thread through mounting tab 508.

In various embodiments, mounting tab 508 may include a slot or key way 506. Shaft 502 may be installable within key way 506. Tabs 524 of shaft 502 may engage, contact, and/or capture mounting tab 508. Moreover, mounting tab 508 may comprise one or more retaining tabs 510. Retaining tabs 510 may define a slot that receives and at least partially retains tabs 524 of shaft 502.

In various embodiments and with reference to FIGS. 6A-6C, stabilization assembly 600 may include a shaft 602 that includes one or more flat portions or surfaces 604, as shown in cross section A-A in FIG. 6C. Shaft 602 may be mountable in mounting tab 608. Mounting tab 608 may comprise a key slot 608. Key slot 608 may include a first portion that allows the flat portions 604 of shaft 602 to pass through and a second portion that is configured to engage and retain the non-flat (e.g., round, oval, etc.) portion of shaft 602 when shaft 602 is rotated. Shaft 602 may also be installed with an adhesive or locking substance to insure shaft 602 is retained in the second port of key slot 606. Moreover, the load and/or stabilizing engagement with the roof surface may be adjustable to any suitable height based on the length of the flat portion 604 of shaft 602.

Figure 7:
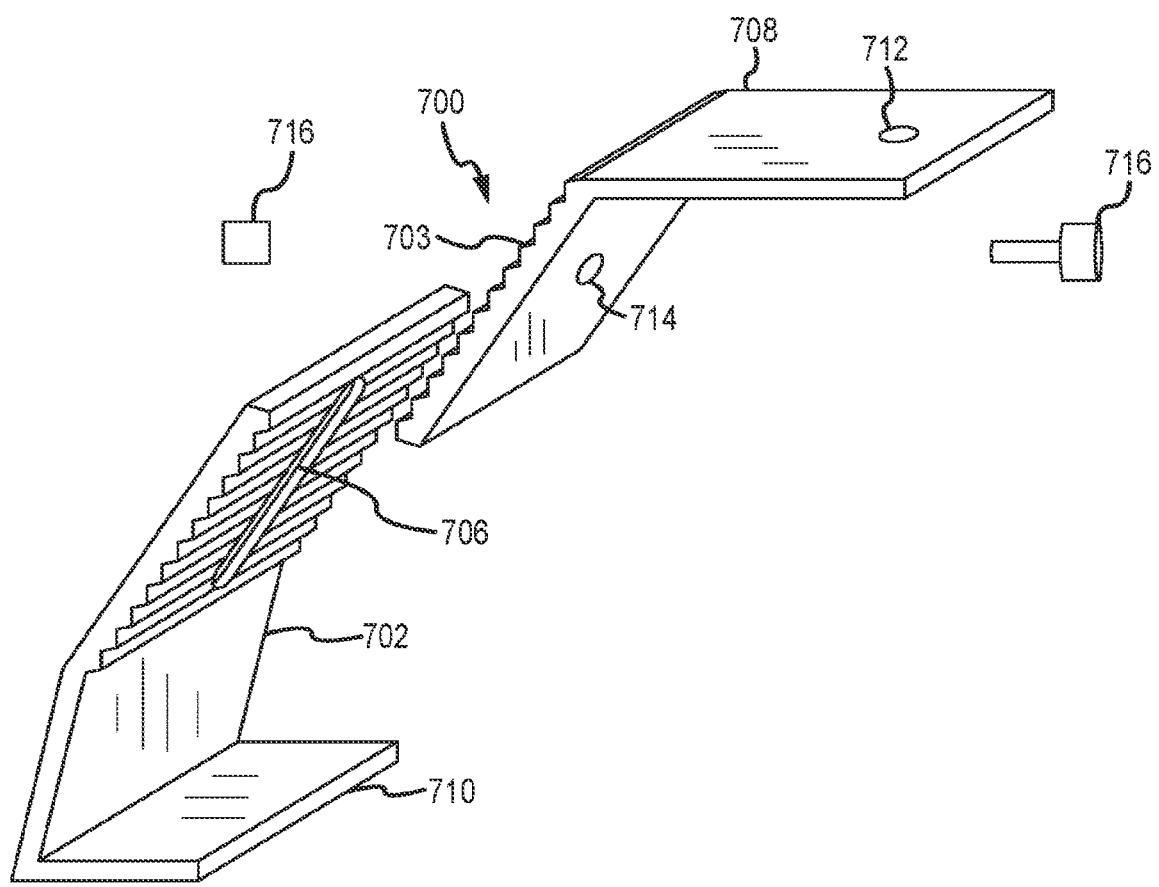
FIG. 7 illustrates a perspective view of a sixth stabilization system, in accordance with various embodiments.

In various embodiments and with reference to FIG. 7, stabilization assembly 700 may include a stabilization shaft or member 702 that is configured to engage a mounting tab 708. Mounting tab 708 may be configured to install in and be engaged by a coupling (e.g., with existing coupling hardware or fasteners). Mounting tab 708 may be secured in coupling via hole 712. Mounting tab 708 may comprise a support tab 703 that is configured to engage member 702. Tab 703 and member 702 may be operatively coupled to one another via a fastener 716 (e.g., a screw, a nut and bolt, and/or the like). Member 702 may comprise and/or include a slot 706 and/or a foot 710. Slot 706 is configured to provide adjustability of member 702 and/or foot 710 relative to the coupling along the entire length of slot 706. In the regard, the engagement of member 702 and/or foot 710 and stabilization of the coupling may be adjusted by adjusting member 702 relative to support tab 703 along slot 706.

Figure 8A:
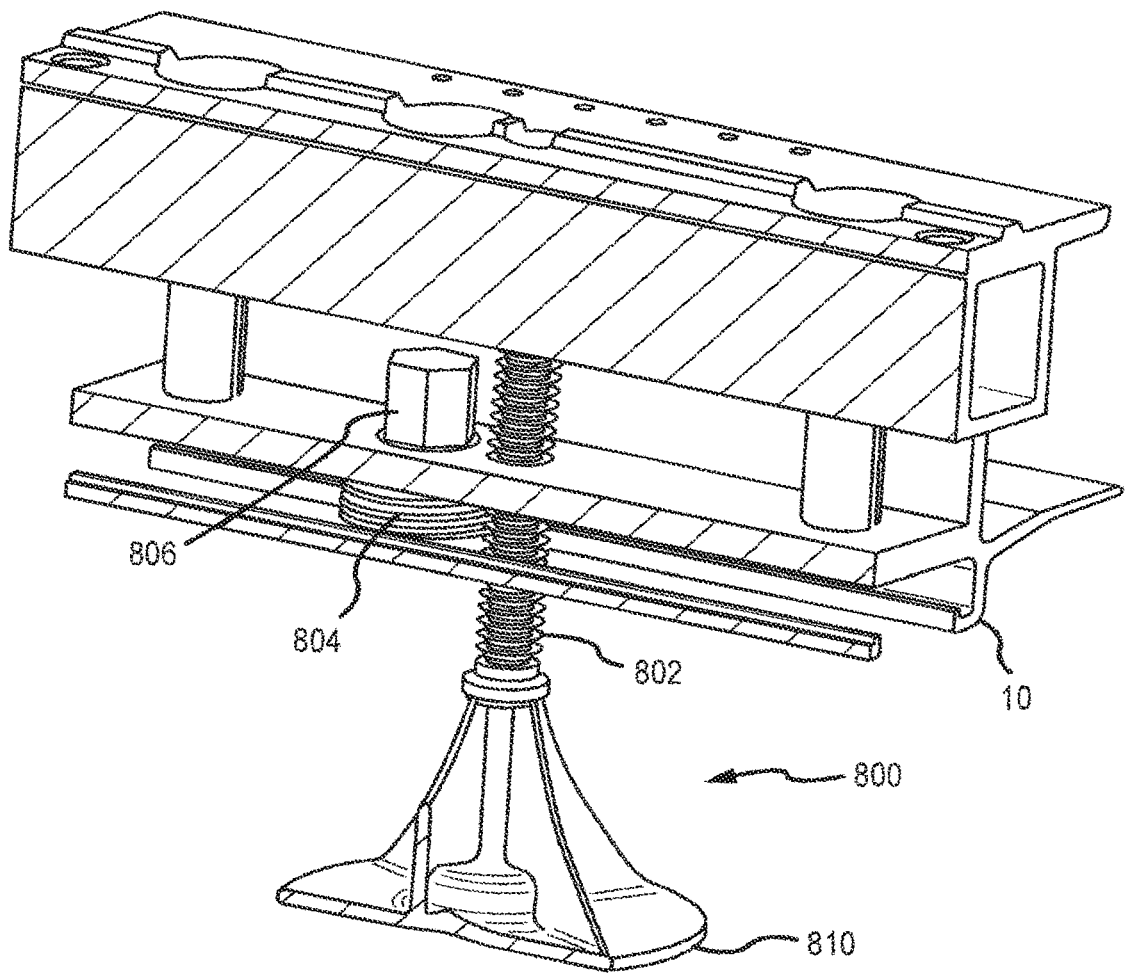
FIGS. 8A-8C illustrate various view of a seventh stabilization system, in accordance with various embodiments.
Figure 8B:
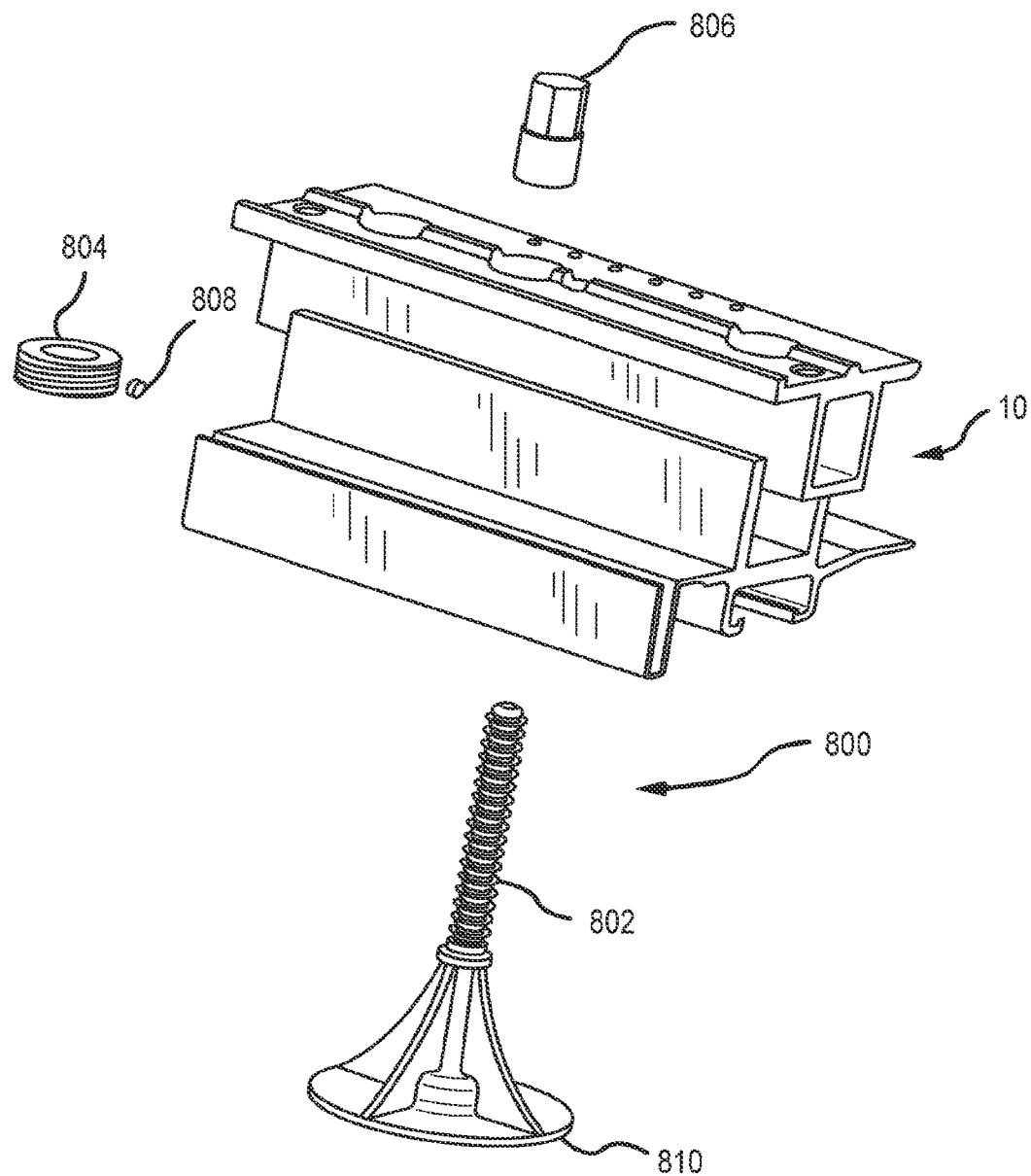
Figure 8C:
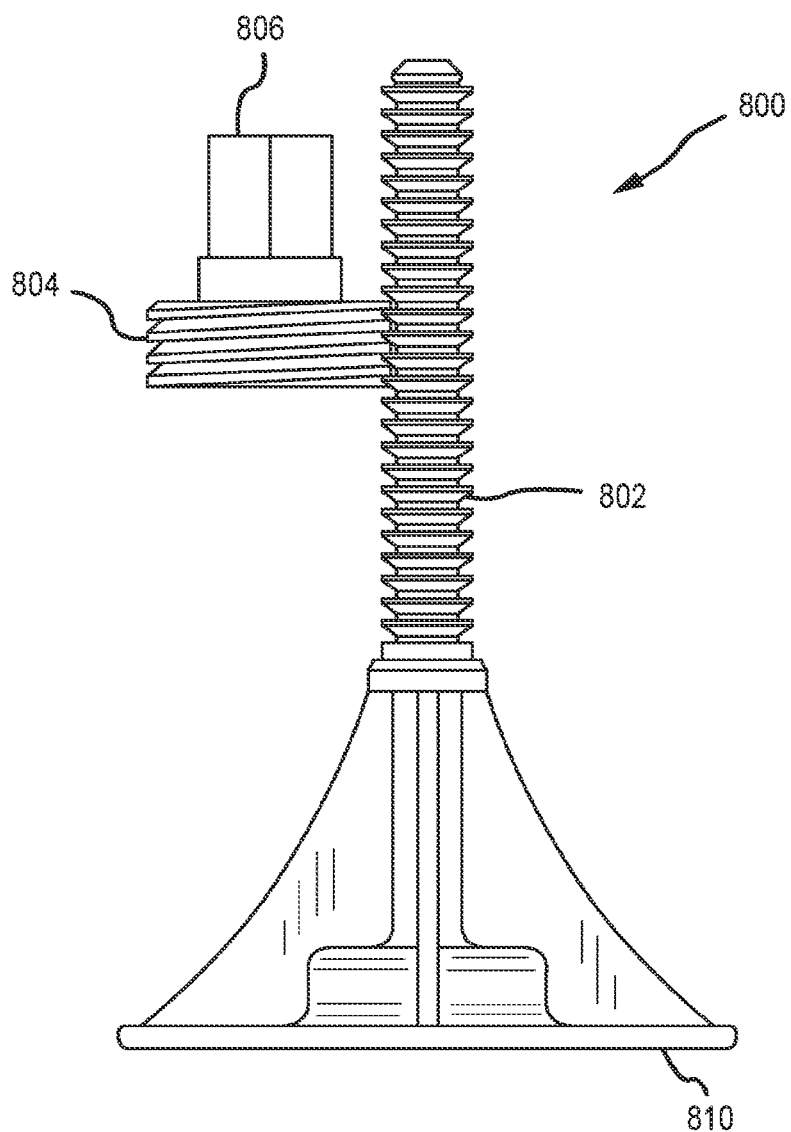

In various embodiments and with reference to FIGS. 8A-8C, stabilization system 800 may comprise shaft 802 and foot 810. Shaft 802 may be configured to thread into and/or may be retained in coupling 10. Stabilization system 80 may also comprise a worm gear 804. Worm gear 804 may be configured to engage and drive shaft 802 (e.g., worm gear 804 and shaft 802 may have complimentary threads). Worm gear 804 may also comprise a drive shaft (e.g., a shaft that is configured with a ½-inch drive or a tapered profile as described herein). The drive shaft may in integrally formed on worm drive 804 and/or may be assembled together with worm gear 804 with a fastener 808 (e.g., a set screw, a set pin, and/or the like). In operation, actuation (e.g., spinning) of worm drive 804 via drive shaft 806 can cause shaft 802 and/or foot 810 to raise or lower to engage a roof surface and stabilize coupling 10.

In various embodiments, the shafts described herein may have a circular profile. The shafts described herein may also have non-circular or partially circular profiles. For example, a shaft profile may be square, rectangular, oval, semi-circular with one or more flats, hexagonal, octagonal, and/or the like. In this regard, the shafts described herein may have any suitable profile. Moreover, the feet described herein may have a flat, rounded or other suitable profile for distributing a load and/or maintaining stabilized engagement with a roof surface when installed with a solar panel coupling that supports one or more solar panels.

In various embodiments, the stabilization assemblies described herein may be installed in coupling 10 at the time of manufacture. The stabilization assemblies described herein may also be assembled in coupling 10 in the field. The stabilization assemblies may be installed on an end of coupling 10 or through a hole 12 in coupling 10. The stabilization assemblies may be accessed and/or may be adjustable after installation on coupling 10 and the solar panels in coupling 10.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus

The invention claimed is:

1. A stabilization assembly, comprising:
   a shaft;
   a foot coupled to the shaft configured to engage a roof surface;
   a nut having a flange, the nut coupled to the shaft, a snap plate disposed on the shaft between the foot and the nut, and a retention plate comprising a plurality of deformable arms that are configured to removably installable within a solar panel coupling, wherein a distance between the nut and the foot is adjustable by translating the nut along the shaft;
   the solar panel coupling comprising a top portion and a bottom portion, the bottom portion defining a first opening, and
   wherein the shaft is installable through a first hole defined in the solar panel coupling
   a solar panel coupled to and supported by the solar panel coupling,
   wherein the nut disposed between the solar panel coupling and the snap plate is configured to change a position of the shaft relative to the solar panel coupling.

2. The stabilization assembly of claim 1, wherein the stabilization assembly is configured to stabilize the solar panel coupling to aid in installation of solar panels.

3. The stabilization assembly of claim 1, wherein at least one of the shaft and foot are configured to create a loaded engagement between the solar panel coupling and the roof surface in response to being installed on the roof surface.

4. The stabilization assembly of claim 1, wherein the solar panel coupling is configured to support a first solar panel and an item.

5. The stabilization assembly of claim 1, wherein the nut is alignable with a second hole and a passage defined in the solar panel coupling.

6. The stabilization assembly of claim 5, wherein the nut is accessible through the second hole and the passage.

7. A stabilization assembly installable on a roof surface, comprising:
- an item;
- a first solar panel;
- a solar panel coupling configured to support the first solar panel and to engage the item, the solar panel coupling comprising a bottom portion and a top portion separate from the bottom portion, the bottom portion defining a channel and a first hole and the top portion defining a second hole alignable with the first hole;
- a foot assembly sized to be received through the first hole of the bottom portion;
- a retention plate disposed along the bottom portion in the channel and comprising a plurality of deformable arms that are configured to removably installable within the solar panel coupling; and
- a leveling element comprising a flange, the leveling element accessible through the second hole of the top portion, the flange disposed between the solar panel coupling and the retention plate and configured to engage and change a position of the foot assembly relative to the solar panel coupling.

\* \* \* \* \*